United States Patent
Broderick et al.

(10) Patent No.: US 11,174,839 B2
(45) Date of Patent: Nov. 16, 2021

(54) TURBINE WITH SMART PITCH SYSTEM AND BLADE PITCH LOCK ASSEMBLY

(71) Applicant: LOCKHEED MARTIN CORPORATION, Bethesda, MD (US)

(72) Inventors: Daniel A. Broderick, Philadelphia, PA (US); Stephen Firkser, Cherry Hill, NJ (US); Anthony Pellegrino, Marlton, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 301 days.

(21) Appl. No.: 16/531,431

(22) Filed: Aug. 5, 2019

(65) Prior Publication Data

US 2021/0040932 A1    Feb. 11, 2021

(51) Int. Cl.
 *F03D 7/02*      (2006.01)
 *F03B 13/26*     (2006.01)
 *F03B 15/00*     (2006.01)

(52) U.S. Cl.
 CPC .......... *F03D 7/0224* (2013.01); *F03B 13/264* (2013.01); *F03B 15/00* (2013.01); *F05B 2220/32* (2013.01); *F05B 2240/221* (2013.01); *F05B 2240/2212* (2013.01); *F05B 2260/71* (2013.01); *F05B 2270/32* (2013.01); *F05B 2270/328* (2013.01)

(58) Field of Classification Search
 CPC ........ F03D 7/0224; F03B 3/14; F03B 13/264; F03B 15/00; F05B 2220/32; F05B 2240/221; F05B 2240/2212; F05B 2260/71; F05B 2260/79; F05B 2270/32; F05B 2270/328; Y02E 10/20; Y02E 10/30; Y02E 10/72
 See application file for complete search history.

(56) References Cited

U.S. PATENT DOCUMENTS

| | | | |
|---|---|---|---|
| 10,072,715 B2 | 9/2018 | Firkser et al. | |
| 2011/0044813 A1 | 2/2011 | Lindberg et al. | |
| 2012/0114483 A1 | 5/2012 | Carr | |
| 2012/0266708 A1* | 10/2012 | Valero Lafuente | F03D 80/50 74/411.5 |

(Continued)

FOREIGN PATENT DOCUMENTS

| | | |
|---|---|---|
| CN | 201187405 Y | 1/2009 |
| KR | 10-2014-0085000 | 7/2014 |
| KR | 10-2018-0100604 | 9/2018 |

OTHER PUBLICATIONS

International Search Report, dated Sep. 21, 2020.

*Primary Examiner* — Igor Kershteyn
(74) *Attorney, Agent, or Firm* — Terry M. Sanks, Esq.; Beusse Sanks, PLLC

(57) ABSTRACT

A system comprising a blade pitch system having a set of locking holes. A pitch drive assembly is coupled to the blade pitch system and configured to rotate clockwise or counter-clockwise within a range of angular degrees to adjust a blade pitch angle. The system includes a pitch lock pin-and-hole system including an interface plate and at least one blade pitch lock assembly coupled to the interface plate. Each lock assembly includes a locking pin having a pin center axis parallel with a center axis of a locking hole to engage a respective one locking hole of the set to lock the blade pitch angle.

19 Claims, 12 Drawing Sheets

(56) References Cited

U.S. PATENT DOCUMENTS

| | | | |
|---|---|---|---|
| 2013/0076040 A1* | 3/2013 | Tsutsumi | F03D 9/28 |
| | | | 290/54 |
| 2013/0259688 A1* | 10/2013 | Sorensen | F03D 1/065 |
| | | | 416/1 |
| 2014/0010656 A1* | 1/2014 | Nies | F03D 80/50 |
| | | | 416/204 R |
| 2014/0020459 A1* | 1/2014 | Holzweber | F03D 17/00 |
| | | | 73/112.01 |
| 2014/0161614 A1 | 6/2014 | Vervoorn et al. | |
| 2014/0369836 A1 | 12/2014 | Clark et al. | |
| 2015/0125298 A1 | 5/2015 | Vance et al. | |
| 2016/0312766 A1* | 10/2016 | Rasmussen | F03D 13/30 |
| 2016/0333848 A1 | 11/2016 | Rhymes et al. | |
| 2016/0348647 A1 | 12/2016 | Ebbesen et al. | |

* cited by examiner

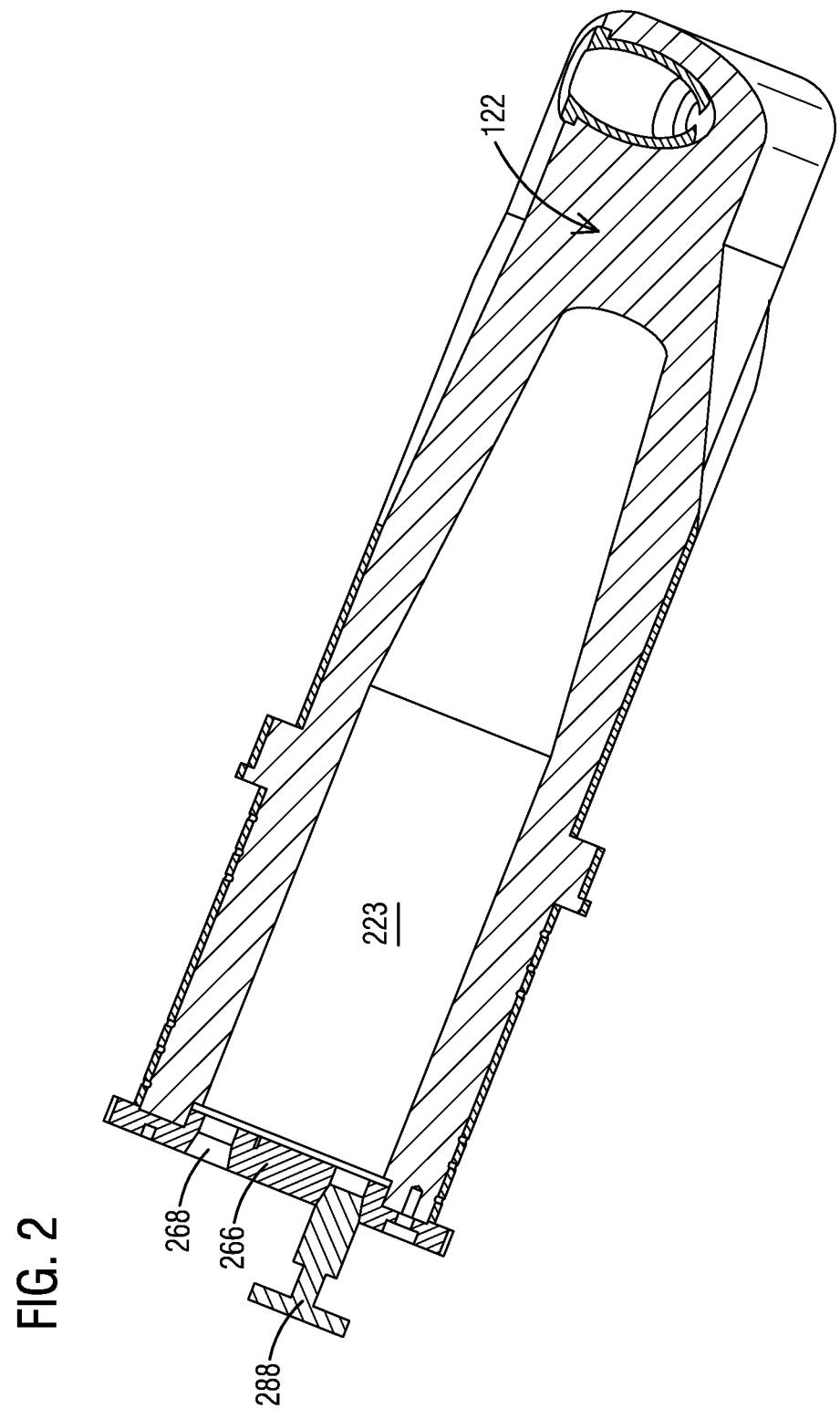

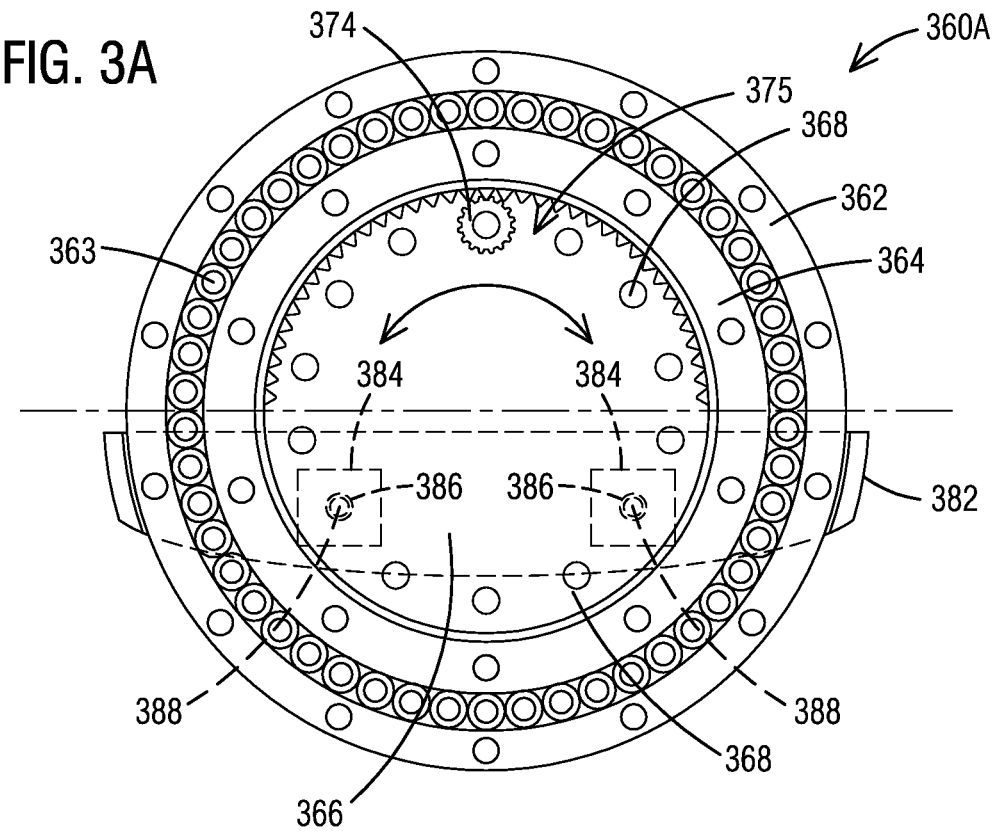
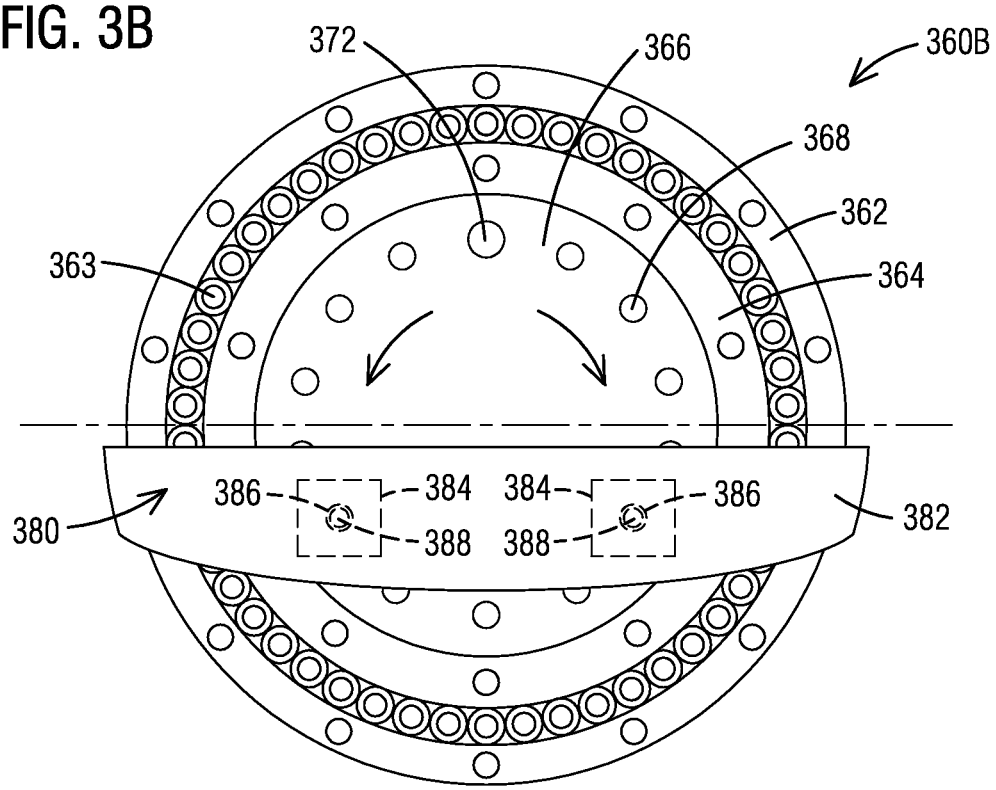

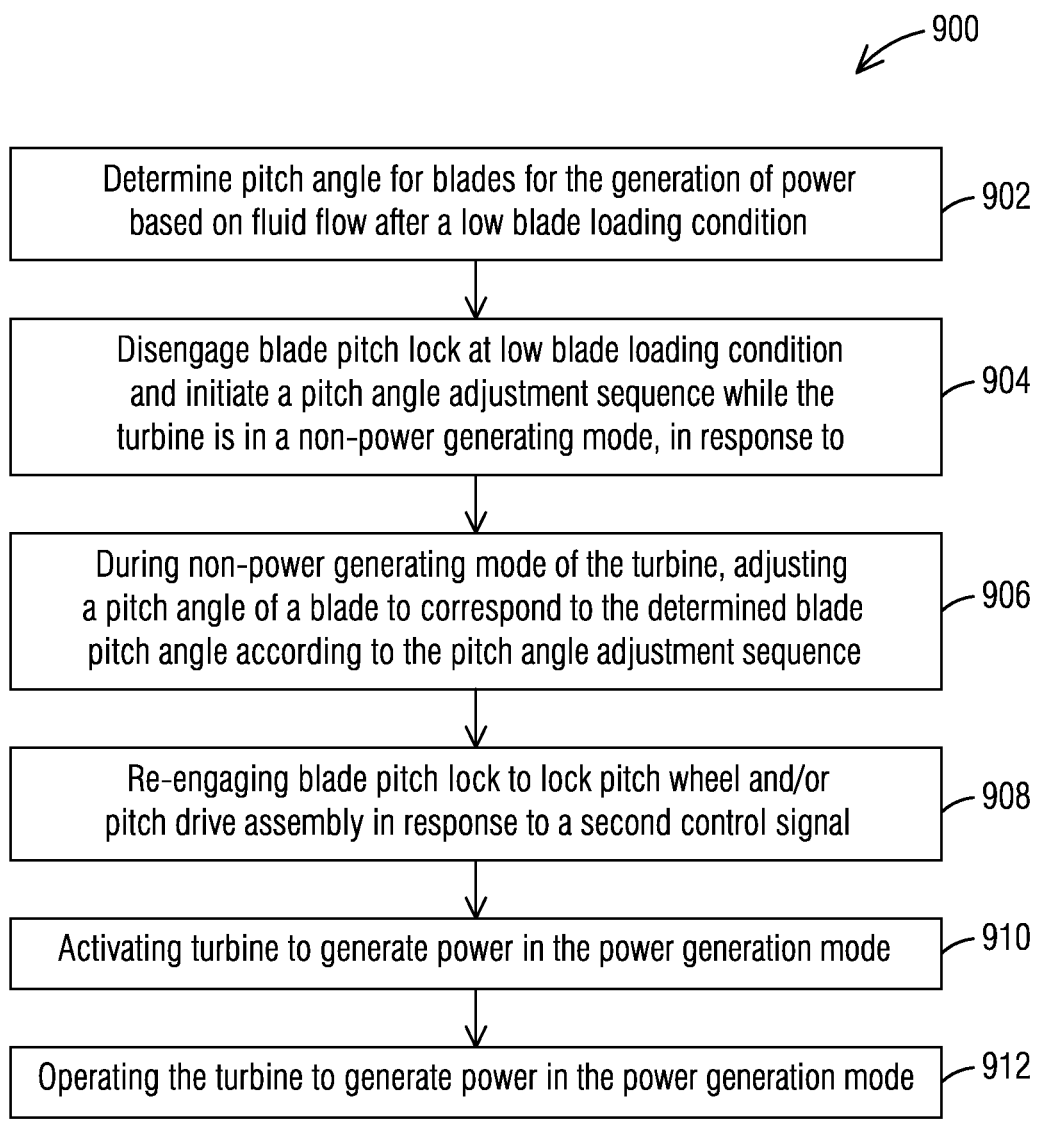

TURBINE WITH SMART PITCH SYSTEM AND BLADE PITCH LOCK ASSEMBLY

BACKGROUND

Embodiments relate to a turbine with a smart pitch system and blade pitch lock assembly to lock turbine blades during high blade loading. The turbine is a fluid-driven turbine.

Current blade pitch systems require actuation systems to retain blades in position during operation, which can result in sub-optimal or detrimental blade positioning in the event of actuation system failure. Mechanical retention of each blade's position reduces risk of the effects of actuation system failure and promotes extended operations.

Previous solutions to address risks have employed high power, high duty hydraulics or electronics to dynamically position and hold the blades in position during operating periods. On the other hand, passive systems hold the blades in place during non-operational periods.

In a wind turbine, a blade is only locked in position when the turbine is non-operational, meaning that said lock does not need to support high loads and is not engaged while the turbine is generating power.

SUMMARY

Embodiments relate to a turbine with a smart pitch system and blade pitch lock assembly during high blade loading. An aspect of the embodiments includes a system comprising a blade pitch system having a set of locking holes and a pitch drive assembly coupled to the blade pitch system and configured to rotate the clockwise or counterclockwise within a range of angular degrees to adjust a blade pitch angle. The system includes a pitch lock pin-and-hole system including an interface plate and at least one blade pitch lock assembly coupled to the interface plate. Each blade pitch lock assembly includes a locking pin having a pin center axis parallel with a center axis of a locking hole to engage a respective one locking hole of the set to lock the wheel and the pitch drive assembly to the blade pitch angle in a lock state.

Another aspect of the embodiments includes a system comprising a turbine including an energy generator, a nacelle, a rotor coupled to the nacelle, and a plurality of blades. The system includes a plurality of smart pitch systems coupled to the plurality of blades. Each smart pitch system comprising: a blade pitch system having a set of locking holes; a pitch drive assembly coupled to the blade pitch system and configured to rotate the clockwise and, alternately, counterclockwise within a range of angular degrees to adjust a blade pitch angle of a respective one blade in a plane perpendicular to a rotor center axis of rotation; and a pitch locking pin-and-hole system including an interface plate and at least one blade pitch lock assembly coupled to the interface plate, each blade pitch lock assembly including a locking pin having a pin center axis parallel with a center axis of a locking hole to engage a respective one locking hole of the set of locking holes in a locked state to lock the wheel to the blade pitch angle.

Another aspect of the embodiments includes a method comprising driving a blade pitch system having a set of locking holes; and rotating, by pitch drive assembly, the blade pitch system clockwise or counterclockwise within a range of angular degrees to adjust a blade pitch angle of a respective one blade in a plane perpendicular to a rotor center axis of rotation relative to a rotor housing. The method includes locking, by a pitch locking pin-and-hole system including an interface plate and at least one blade pitch lock assembly coupled to the interface plate, each blade pitch lock assembly including a locking pin having a pin center axis parallel with a center axis of a locking hole to engage a respective one locking hole of the set of locking holes in a locked state, the wheel to the blade pitch angle.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 2 illustrates a cross-sectional view of the blade mount and locking pin of a blade pitch lock assembly;

FIG. 3A illustrates a back view of a smart pitch system and blade pitch lock assembly for a blade of a fluid-driven turbine;

FIG. 3B illustrates a front view of a smart pitch system and blade pitch lock assembly of FIG. 3A;

FIG. 9A illustrates a flowchart of a method for operating a fluid-driven turbine;

DETAILED DESCRIPTION

Figure 1A:
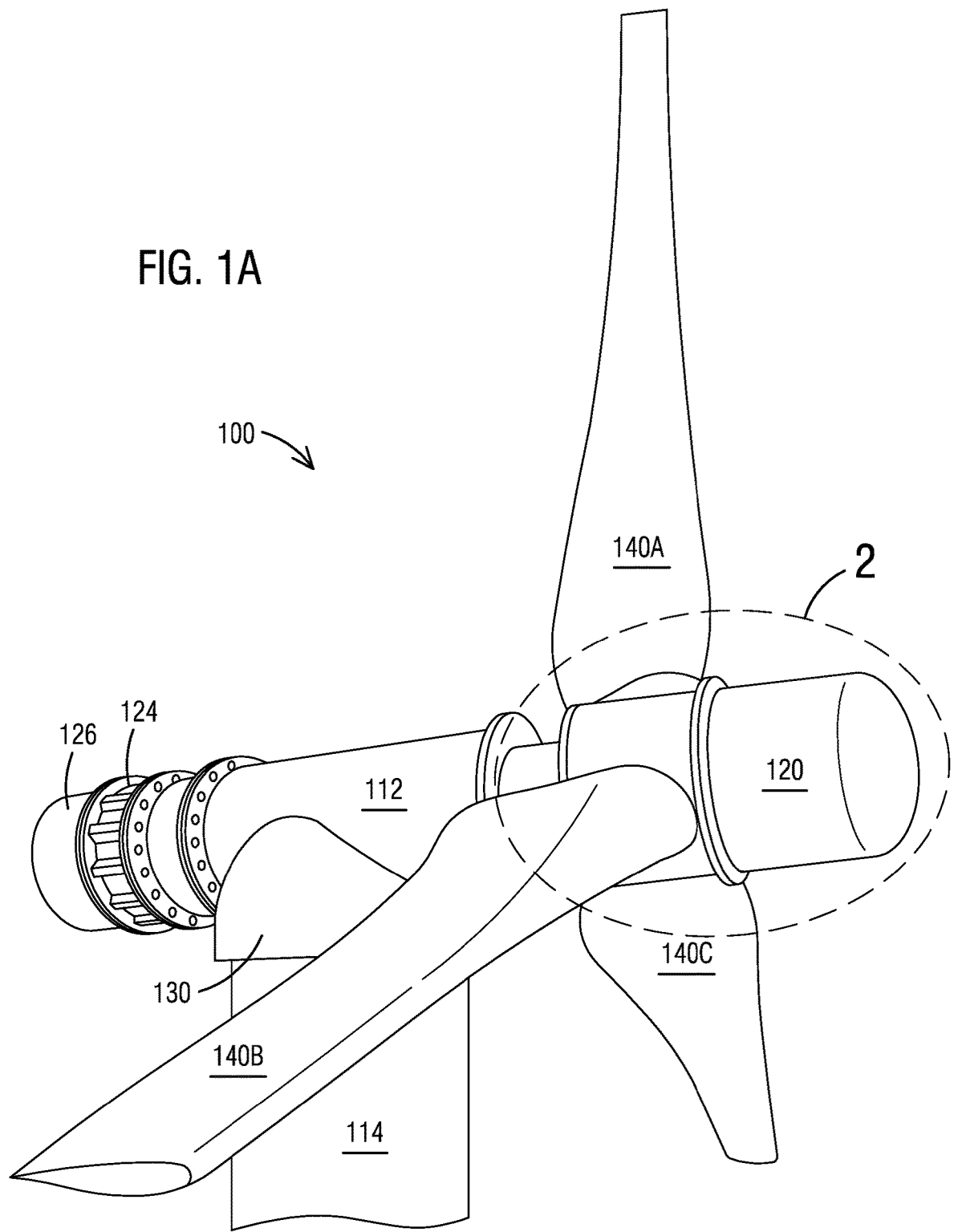
FIG. 1A illustrates a perspective view of a fluid-driven turbine.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The previous solutions discussed above are typically designed to vary the pitch of the blades while the blades are under load, during operational periods. The term "operational periods" corresponds to times when the blades are rotated during a first fluid flow rate or high loading within a first loading range. The inventors have determined that the pitch may be varied by only varying the pitch of the blades during periods of second fluid flow rate lower loading or low loading within a second loading range and achieve nearly the same power output. The first loading range being higher in loading than the second loading range.

Figure 1B:
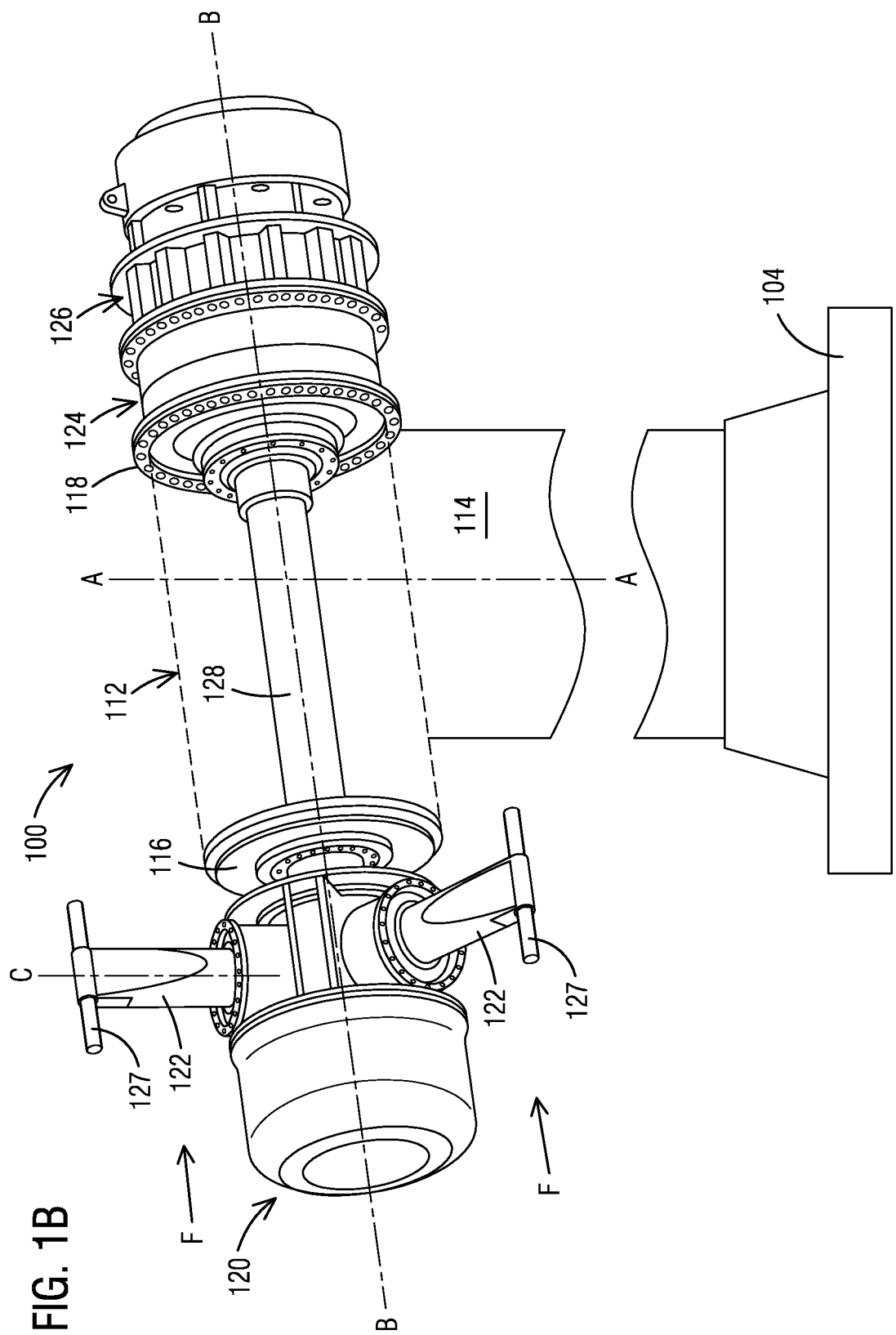
FIG. 1B illustrates a perspective side view of a fluid-driven turbine with the blades removed and a portion of the nacelle housing removed.

With reference to FIG. 1A, a perspective view of a fluid-driven turbine 100 is shown. In FIG. 1B, a portion of a fluid-driven turbine 100 is illustrated with the blades and a portion of the nacelle 112 housing removed. The turbine 100 will be described with reference to both FIGS. 1A and 1B. The turbine 100 includes rotor blades 140A, 140B and 140C coupled to rotor 120, shaft 128 and a generator 126. The shaft 128 extends through a nacelle 112 which connects the rotor 120 to the gearbox 124 so that rotation of the rotor 120 is transferred to the gearbox 124 which in turn results in electricity generation in the generator 126. The detailed construction and operation of the rotor 120, the gearbox 124 and the generator 126 are well known to those of ordinary skill in the art and are not further described herein.

The nacelle 112 is mounted at an upper end of a tower 114, via a yaw drive mechanism (not shown), for rotation relative to the tower 114 about a yaw axis A-A, extending generally vertically. The tower 114 may be mounted directly or indirectly in or on the ground in the case of a wind turbine; the tower 114 can be mounted directly or indirectly in or on a sea floor or the bottom of another body of water in the case of a water or tidal turbine via platform 104.

The nacelle 112 includes a first end 116, which can be a forward or front end, and a second end 118, which can be a back or rear end. The rotor 120 is rotatably mounted at the first end 116 of the nacelle for rotation about a rotation axis B-B. The rotation axis B-B is shown extending substantially horizontally. In other embodiments, the rotation axis B-B can be inclined at an angle to horizontal. The terms "vertical" and "horizontal" are relative terms and should not be limiting in any. In some embodiments, vertical and horizontal terms differentiating one axis from another is intended to denote approximately 90° difference between the axes. The gearbox 124 and generator 126 are mounted at the second end 118.

The yaw drive mechanism is an interface between the nacelle 112 and the tower 114. The yaw drive mechanism may be configured to rotate the nacelle 112 about the yaw axis A-A relative to the tower 114. The yaw drive mechanism changes the azimuthal heading or orientation of the nacelle 112 and the rotor 120 mounted thereon about the yaw axis A-A in order to orient the rotor 120 at the optimal heading relative to the fluid flow F which can change direction. The yaw drive mechanism can have any construction that is suitable for achieving rotation of the nacelle 112 about the yaw axis A-A. The specific construction and operation of yaw drive mechanisms is well known in the art. By way of non-limiting example, the yaw drive mechanism and the yaw brake system (not shown) are described in U.S. patent Ser. No. 10/072,715 B2, titled "TURBINE WITH YAW BRAKE MECHANICS HAVING A ROTOR LOCK AND CORRESPONDING RECEPTACLE," to Applicant, Lockheed Martin Corporation, and which is incorporated herein by reference in its entirety.

The plurality of blades 140A, 140B and 140C (FIG. 1B) are detachably mounted to blade mounts 122 (FIG. 1B). The blade mounts 122 extend generally radially from the rotor 120. In other words, the axis C-C is generally perpendicular to the axis B-B of shaft 128. The blades 140A, 140B and 140C are configured to be rotated about the axis C-C to adjust the pitch angle of the blade.

The blade mounts 122 may have a controlled pitch to permit pitch variation by rotating the blade mounts 122 and blades about axis C-C. The rotor 120 is designed to be rotated about the rotation axis B-B as a result of a force exerted by a fluid, such as water or air, flowing across the blade surfaces and past the blades thereof as illustrated by the arrows F in FIG. 1B. Hence, the blades are the interface to the fluid flow which exerts a force on the blades to cause the blades to rotate. As the blades rotate, the rotor 120 is caused to rotate to effectuate generation of electricity by the generator 126 by rotating the shaft 128 and gears of the gear box interfaced with the generator 126. The blade mounts 122 may include a connector 127.

Turbine 100 may include N blade mounts 122 for connection of N blades wherein N corresponds to the number of blades coupled to the rotor 120. However, a larger or smaller number of blade mounts and blades can be used. In the embodiment of FIGS. 1A and 1B, there are three blades.

Figure 6:
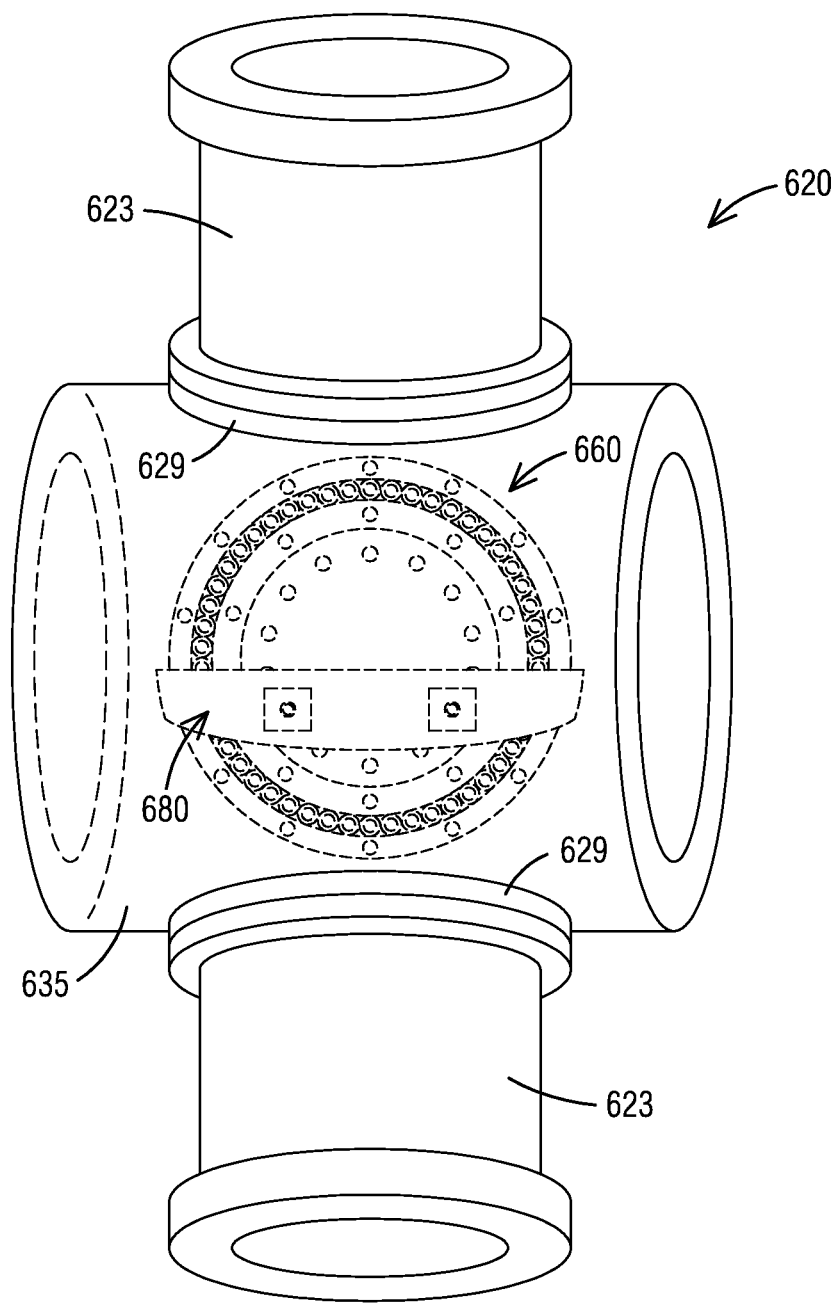
FIG. 6 illustrates a perspective view of a blade rotor incorporating the smart pitch system and blade pitch lock assembly.

FIG. 2 illustrates cross-sectional view of the blade mount 122 and pin of a blade pitch lock assembly. The blade interface coupler 223 may be configured to be coupled to the smart pitch system 360A (FIG. 3A) rotatably coupled to the rotor housing 635 (FIG. 6). A blade pitch lock assembly may include one or more locking pins 288 configured to be retracted from hole 286 to a disengaged state. When the pin 288 is disengaged, the pin 288 is moved out of the hole 286. The one or more locking pins 288 may be configured to be injected into one or more of the holes 268 of the set of holes in the blade pitch system 266 to lock the blade pitch system 266 to a particular angular rotation within the predetermined or variable range of degrees. The blade pitch system 266 includes a wheel with a set of locking holes circumferentially spaced around the wheel, wherein the angular pitch of the blade is adjusted relative to the set of holes of the blade pitch system.

The smart pitch system and blade pitch lock assembly will be described in relation to FIGS. 3A-3D and FIG. 4. The smart pitch system of FIGS. 3A-3D is essentially the same.

Figure 4:
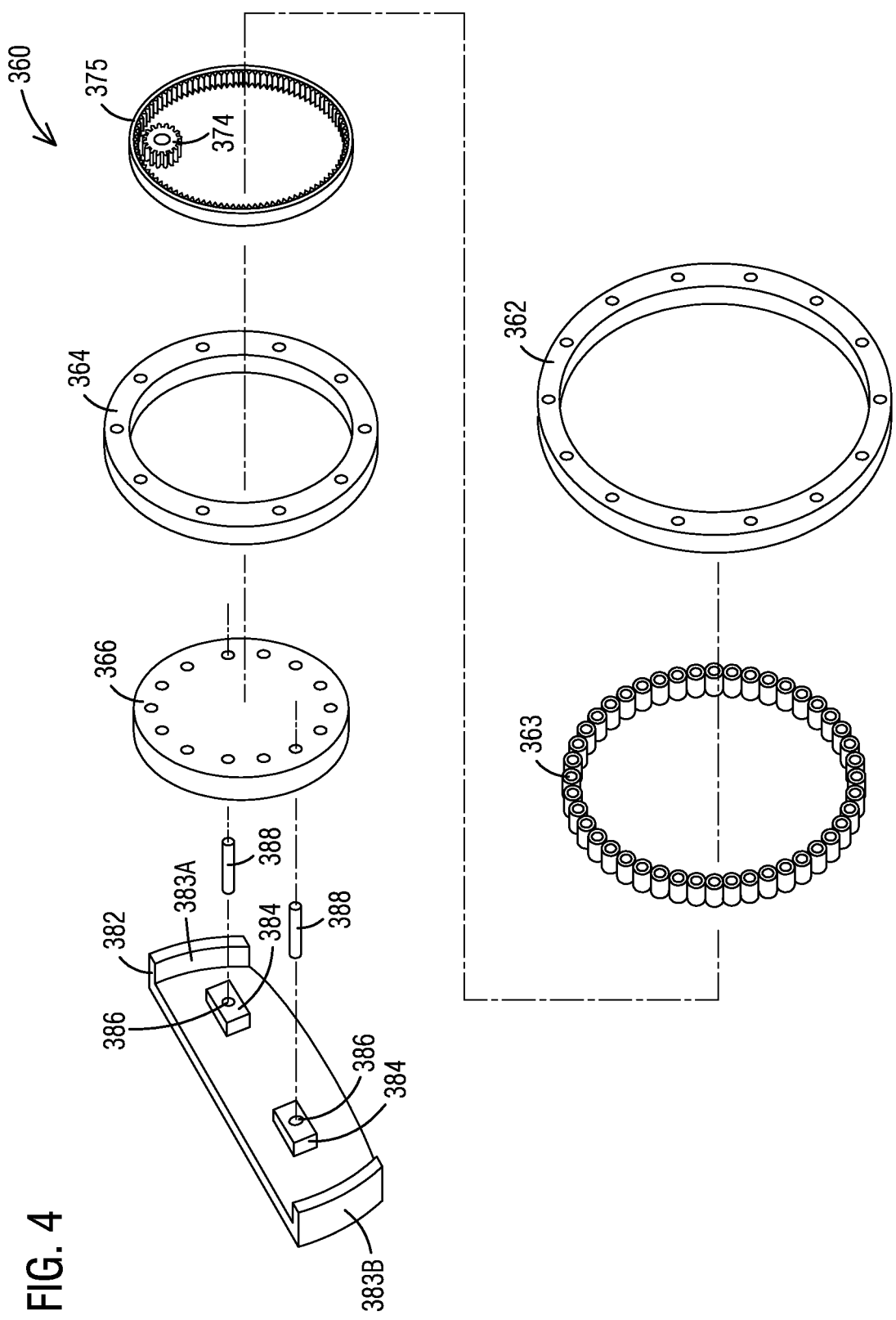
FIG. 4 illustrates an exploded view of the smart pitch system and blade pitch lock assembly.
Figure 5A:
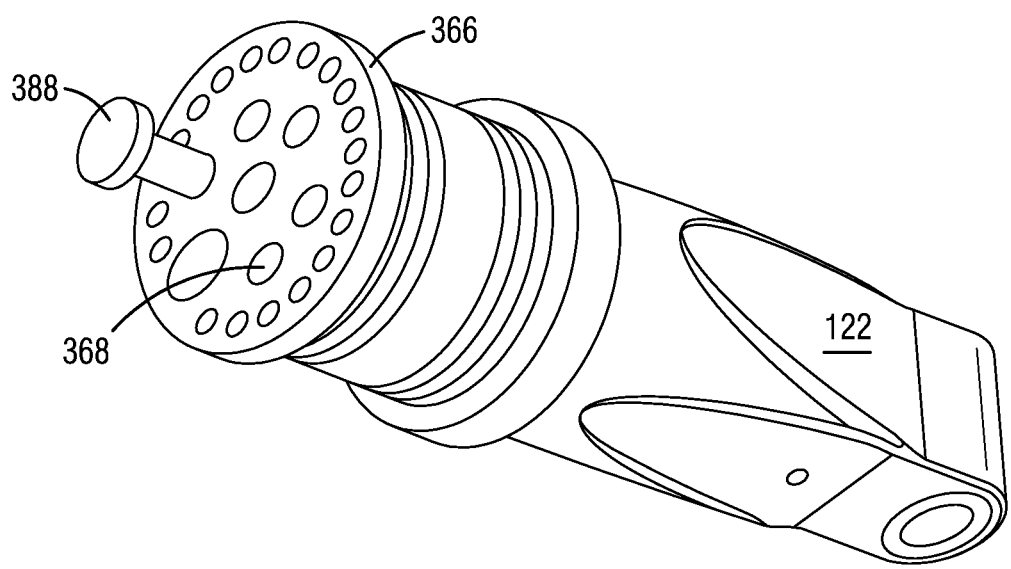
FIG. 5A illustrates a perspective view of the smart pitch system and locking pin of the pitch lock assembly.
Figure 5B:
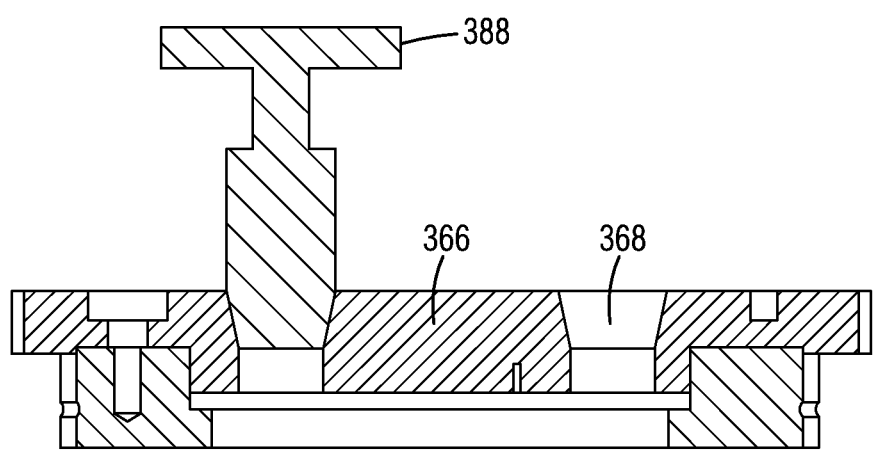
FIG. 5B illustrates a cross-sectional view of a locking pint of the blade pitch lock assembly relative to the blade pitch system.

FIG. 4 illustrates an exploded view of the smart pitch system 360 and blade pitch lock assembly. Thus, only the differences will be described in detail. Furthermore, the rotor, smart pitch system and blade pitch lock assembly may include other structural elements which are not shown for the sake of brevity. FIG. 5A illustrates a perspective view of the smart pitch system and blade pitch lock assembly. FIG. 5B illustrates a cross-sectional view of the blade pitch lock assembly.

Figure 3C:
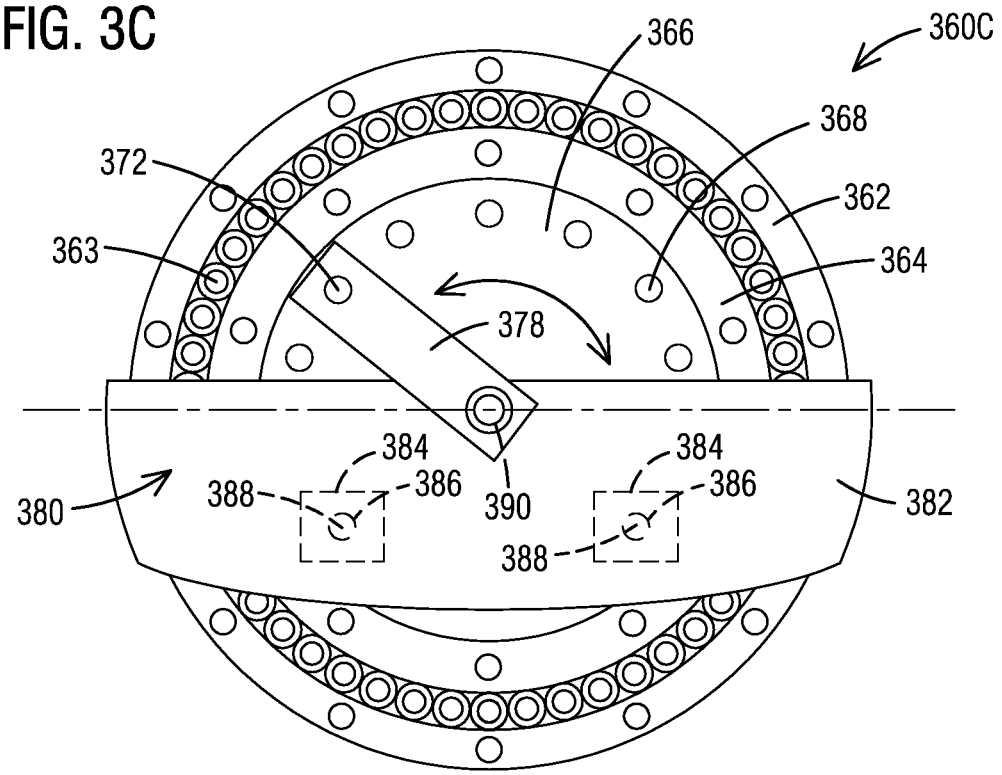
FIG. 3C illustrates a front view of a smart pitch system and blade pitch lock assembly and with an optional linking arm in a first position.
Figure 3D:
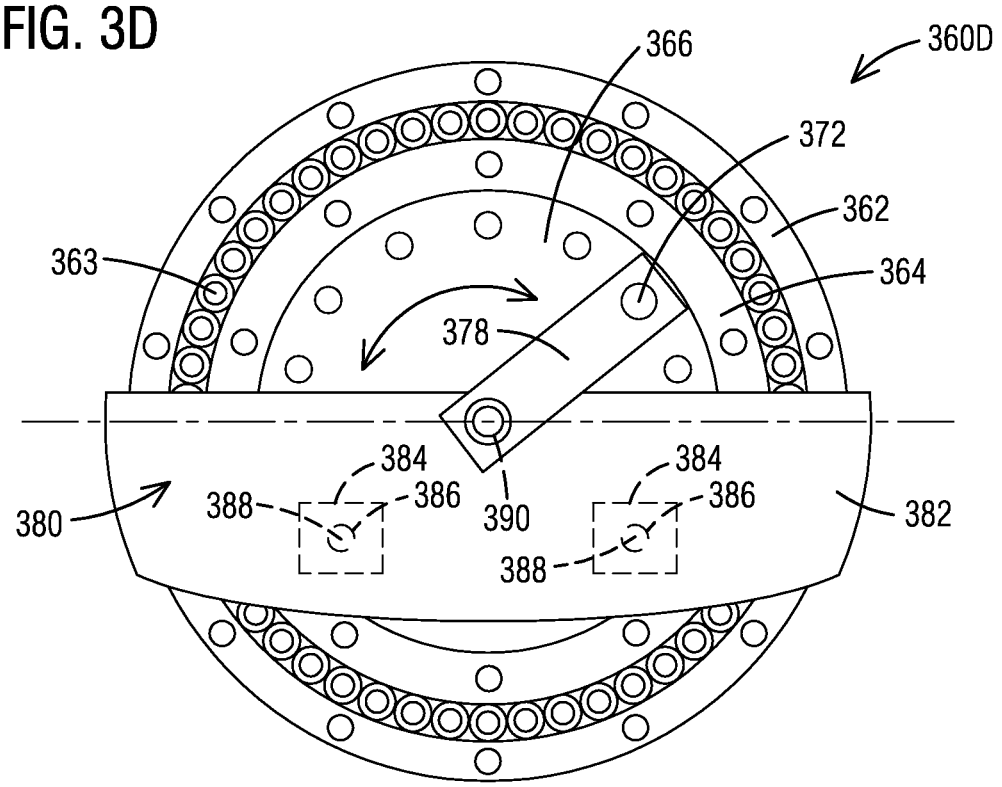
FIG. 3D illustrates a front view of a smart pitch system and blade pitch lock assembly of FIG. 3B and with the optional linking arm in a second position.

Specifically, FIG. 3A illustrates a back view of a smart pitch system 360A and blade pitch lock assembly for a blade of a fluid-driven turbine. FIG. 3B illustrates a front view of a smart pitch system 360B and blade pitch lock assembly of FIG. 3A. With reference to FIG. 3C, a front view of a smart pitch system 360C and blade pitch lock assembly with an optional linking arm 378 in a first position is illustrated. On the other hand, FIG. 3D illustrates a front view of a smart pitch system 360D and blade pitch lock assembly and with an optional linking arm 378 in a second position. The first position and second position are different positions associated with a particular blade pitch angle. The terms "first" and "second" are used as a frame of reference and should not be limiting in any manner. The blade pitch angle may be adjusted in a range from 0°-180°. In some embodiments, the blades may be adjusted in a range from 45°-135°. In some embodiments, the blades may be adjusted in a range from 30°-150° or any other range within 360°, but limited by the locking pin placement relative to the locking holes, described below. In some embodiments, a blade pitch angle can be further extended by a combination of blade pitch angle adjustment and the yaw rotation to change the direction of the nacelle or location of the nacelle about the axis A-A. The smart pitch systems 360A, 360B, 360C and 360D will be further denoted herein by reference numeral 360 hereinafter.

Referring now to FIGS. 3A and 3B, the smart pitch system 360 may comprise a first bearing ring 362 and a second bearing ring 364 wherein the first bearing ring 362 is generally concentric with the second bearing ring 364. The first bearing ring 362 and a second bearing ring 364 rotate about a center axis. The first bearing ring 362 and second bearing ring 364 may rotate about bearing 363. The second bearing ring 364 may include an inner diameter.

The smart pitch system 360 may comprise a blade pitch system 366 with a wheel dimensioned to nest within the inner circle of the second bearing ring 364. The term "blade pitch system and wheel" may use reference numeral 366 interchangeably. The pivot wheel 366 may be coupled to the second bearing ring 364 by fasteners. The pivot wheel 366 may comprise at least a first hole configured to have coupled thereto a drive motor 372 from a first side of the pivot wheel 366. The drive motor (not shown) at motor coupler 372 (FIG. 3B) coupled through the pivot wheel 366 to a gear wheel 374 (FIG. 3A) of a rack and pinion unit. The gear wheel 374 may be configured to rotate clockwise or counterclockwise along a predetermined or variable range of degrees about a pinion 375, as best seen in FIG. 3A, positioned around at least a portion of an inner surface of the second bearing ring 364. The blade pitch system 366 may comprise a set of holes 368 arranged around the pivot wheel.

The smart pitch system 360 may comprise a blade pitch lock assembly 380 (FIG. 3B). The lock assembly 380 may include an interface plate 382 configured to extend in a plane essentially perpendicular to the center axis. The interface plate 382 may include at least one lock housing 384 having a receptacle 386. The interface plate 382 may have side walls 383A and 383B (FIG. 4) which wrap around the outer perimeter of the one or more of the bearing rings. The housing 384 may be configured to be affixed to the interface plate 382 via fasteners. Plate 382 may have a structural connection to blade couplers 623 (FIG. 6), flange 629 (FIG. 6) or rotor housing 635 (FIG. 6) so as to oppose the motion of the blade.

The blade pitch lock assembly 380 may include a locking pin 388 configured to be retracted within the receptacle 386 in a disengage state. The one or more locking pins 388 may be configured to be injected into one or more of the holes 368 of the set of holes in the pivot wheel of the blade pitch system 366 to lock the pivot wheel to a particular angular rotation within the predetermined or variable range of degrees. In some embodiments, the blade pitch lock assembly 380 includes a plurality of lock housings 384, each with a locking pin 388 configured to be retracted within receptacle 386 in a disengage state. However, each locking pin 388 is configured to be injected into a different one of the holes 368 of the set of holes, simultaneously. In some embodiments, two or more locking assemblies 380 will be used to lock the pivot wheel of the blade pitch system 366 and support the loading on the blade during peak power generation by the turbine. FIGS. 5A and 5B illustrate a respective one locking pin 388 locked in a hole 368 formed in the wheel of the blade pitch system 366, wherein the locking pin 388 is in an engaged state.

With reference to FIGS. 3C and 3D, an optional linking arm 378 may be coupled to the interface plate 382 via bearing 390. The linking arm 378 is also coupled to a drive motor via motor coupler 372. As the gear 374 rotates about the pinion 375 about and inner surface of the second bearing ring 364, the linking arm 378 follows the clockwise or counterclockwise rotation of the drive motor to adjust the blade pivot angle. The pinion 375 may be arranged 360° around the inner surface of the second veering ring or only a portion to limit the rotation clockwise or counterclockwise of the gear 374 of the rack and pinion unit. The locking pin 388 when injected into a hole of the wheel of the blade pitch system 366 locks the wheel so that angular rotation clockwise or counterclockwise is prevented.

The blade pitch lock assembly may be actuated hydraulically, pneumatically, and/or electrically. The pitch drive assembly may be electrically actuated to cause the drive motor to rotate. For example, the turbine controller may provide electrical control signals.

The turbine 100 may include hydraulic systems 199 (FIG. 10) coupled to the housing 384 to control the locking pins to retract and eject from the holes. The locking pin may be a piston.

FIG. 6 illustrates a perspective view of a blade rotor 620 incorporating the smart pitch system 660 (i.e., smart pitch system 360) and blade pitch lock assembly 680 (i.e., blade pitch lock assembly 380). The rotor 620 includes rotor housing 635. The flanges 629 coupled to the blade couplers 623 (i.e., blade interface couplers 223) are shown.

Figure 7:
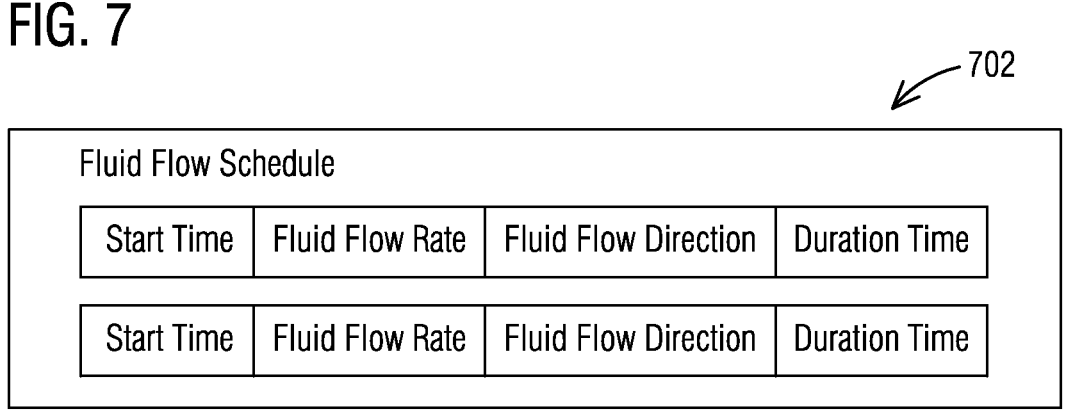
FIG. 7 illustrates a block diagram of a fluid flow schedule.
Figure 8:
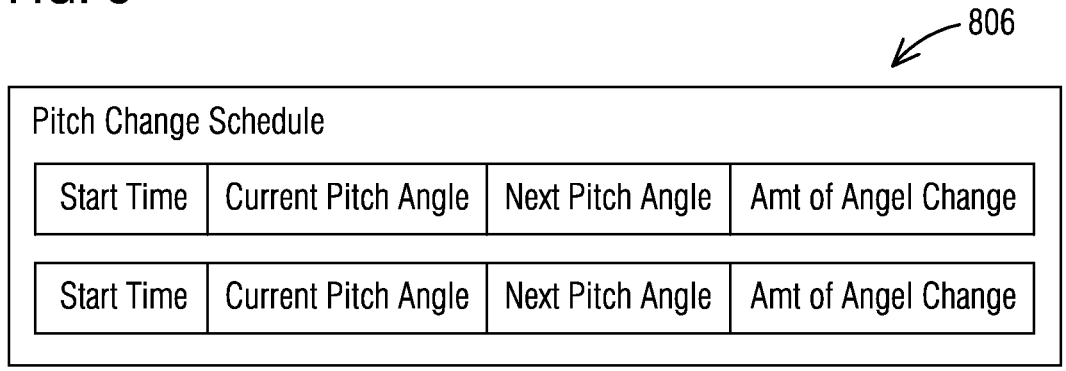
FIG. 8 illustrates a block diagram of a pitch change schedule.
Figure 10:
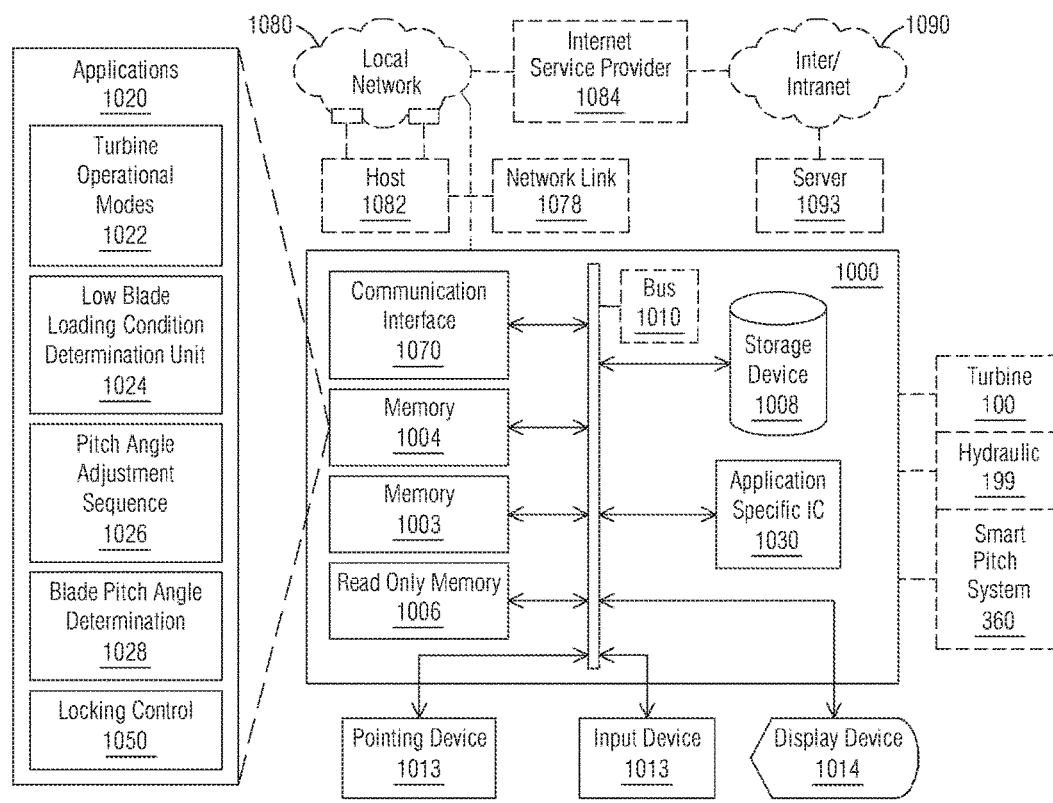
FIG. 10 illustrates a block diagram of a computing system for controlling the fluid-driven turbine.

FIGS. 7 and 8 illustrate block diagrams of a fluid flow schedule 702 and pitch change schedule 806, both of which may be stored in memory coupled to a turbine controller (i.e., computing system 1000, FIG. 10). The smart pitch system receives control signals from the turbine controller to adjust the blade pitch angle and lock the wheel from being rotated by pitch drive assembly. The fluid flow schedule 702 includes current tidal fluid flow data, imminent tidal fluid flow data and future tidal fluid flow data.

The expected fluid flow rates and direction are arranged in a database including the fluid flow schedule 702. The fluid flow schedule 702 may include start times, fluid flow rate, fluid flow direction and a duration of time. The tidal flow rate may vary from day to day. The tidal flow rate may change hour by hour or for a predicted time interval based on known tidal modeling. The tidal flow rate may also indicate the start time of a slack tide and the duration for which tidal flow will maintain the slack tide condition. In some embodiments, during the slack tide condition, the loading force exerted by the fluid on the surfaces of the blades is minimal or the least loading force.

The faster the flow of water, the higher the loading force is exerted on the surfaces of the blades. Additionally, the tidal flow changes from high tide to low tide conditions. Before the high tide condition or after the low tide condition, the tidal flow rate may be at a slack tide. The fluid flow scheduler 702 is configured to identify from the fluid (tidal) flow rate, the start time, direction and duration on a day to day basis. Based on the direction of the tidal flow, the pitch angle may be determined. The amount of pitch movement clockwise or counterclockwise may be a function of the current pitch angle position and the amount of rotation to move the wheel to the next pitch angle position.

The fluid flow schedule 702 may pre-store for a 24-hour interval, a week interval, a month interval, a quarterly interval, a biannual interval or an annual interval, the predicted flow rates, the expected start time of the low blade loading condition, the fluid direction and duration. The fluid flow schedule 702 may be updated periodically to update previously pre-stored data or to add entries of future tidal fluid flow data.

The pitch change schedule 806 may include pitch change data including one or more of a start time, a current pitch angle, a next pitch angle and amount of angle change. The next pitch angle may be determined as a function of the speed and direction of the fluid flow rate after the low blade loading condition. The next pitch angle is determined so that the turbine operates for optimum power generation for a single pitch angle between a pair of low blade conditions or slack tide conditions. The optimum power generation for a single pitch angle may be the maximum power generation within the turbines power rating established by the manufacturer for the tide condition.

In one embodiment, pitch changes take place at slack tide such that the computing system causes the rotor lock pin-and-hole system to unlock or disengage the lock assembly. Thereafter, the pitch angle of the blade changed according to the next pitch angle. The sequence for adjusting the pitch angle may be performed during a time period limited to the expected duration of the low blade loading condition associated with the tidal flow. After the pitch angle adjustment process of the blade is complete, the computing system re-engages the rotor lock pin-and-hole system to lock the blades in place. The lock of the rotor lock pin-and-hole system is configured to support the full turbine operating loads and is engaged continuously while the tidal turbine is generating power. The operating loads are established based on the manufacture and the force of water applied to the blades during operation at the blade pitch angle.

FIG. 9A illustrates a flowchart of a method for operating a fluid-driven turbine 100. The method steps will be performed in the order shown or a different order. Steps may be added or deleted. Furthermore, one or more steps may be performed contemporaneously.

The method 900 described herein may be performed by a turbine controller having at least one processor. The turbine controller will be described in relation to the computing system of FIG. 10. The method 900, at block 902, may comprise determining, by the turbine controller, a blade pitch angle for optimal generation of power by a turbine based on fluid flow after a low blade loading condition. The method 900, at block 904, may comprise disengaging a blade pitch lock at the low blade loading condition and initiating a pitch angle adjustment sequence while the turbine is in a non-power generation mode, in response to a first control signal from the turbine controller. The method 900, at block 906, may comprise, during the non-power generation mode of the turbine, adjusting the blade pitch angle of a blade to correspond to the determined blade pitch angle according to the pitch angle adjustment sequence. The method 900, at block 908, may comprise, reengaging the blade pitch lock in response to a second control signal from the turbine controller. The method 900, at block 910, may comprise, activating the turbine to generate power in a power generation mode with the blades continuously locked to the determined blade pitch angle. The method 900, at block 912, may comprise operating the turbine to generate power in the power generation mode. During block 912, while the turbine is operating to generate power in the power generation mode, the blades are continuously maintained in a locked state. In other words, the blades are generally only adjusted when the least amount of loading force of the tidal fluid being exerted on surfaces of the blade.

Figure 9B:
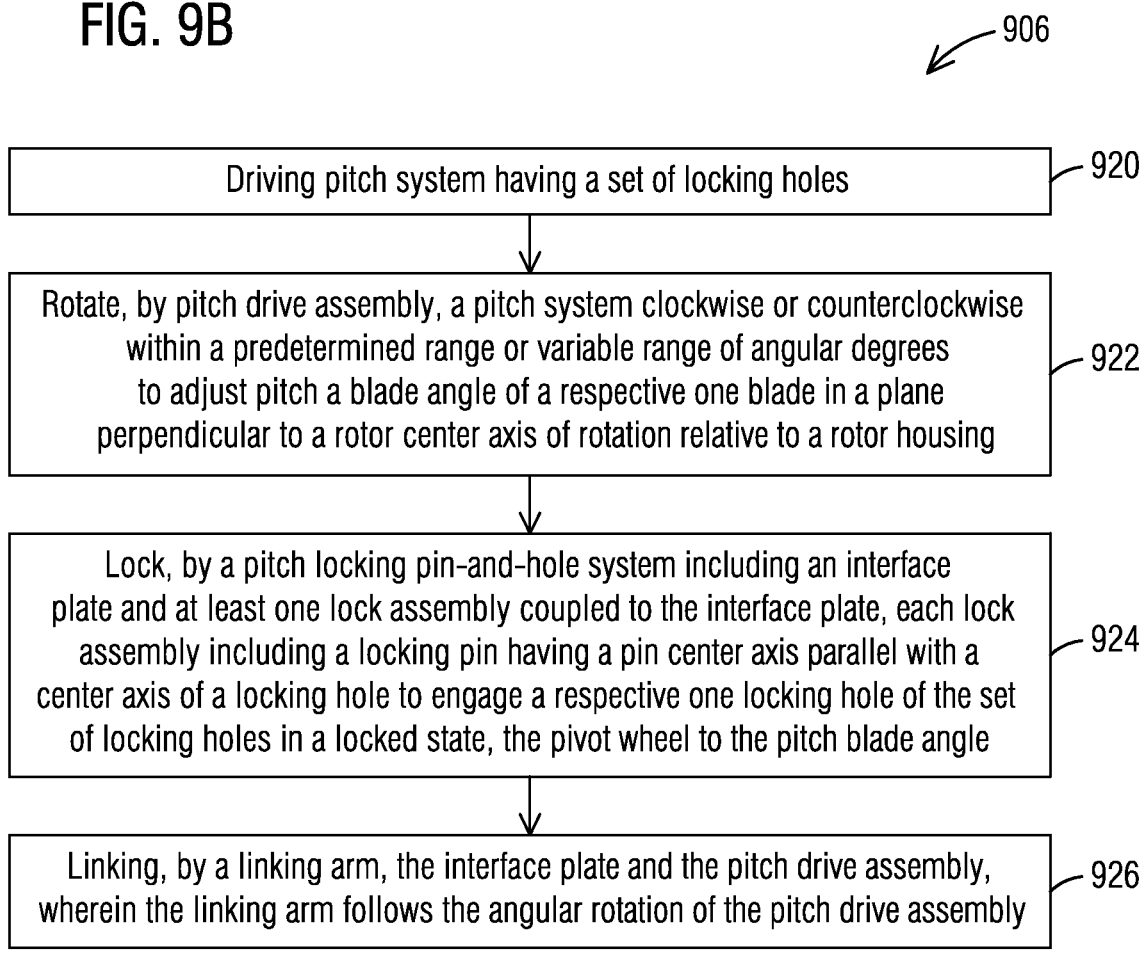
FIG. 9B illustrates a flowchart of a method for a pitch adjustment sequence.

FIG. 9B illustrates a flowchart of a method for a pitch adjustment sequence. The method of block 906 will now be described. The method 906 may comprise driving a pitch pivot wheel of a blade pitch system having a set of locking holes, at block 920. The method 906, at block 922, may comprise rotating, by pitch drive assembly, the pitch pivot wheel clockwise or counterclockwise within a predetermined or variable range of angular degrees to adjust a blade pitch angle of a respective one blade in a plane perpendicular to a rotor center axis of rotation relative to a rotor housing. The method 906, at block 924, may comprise locking, by a pitch locking pin-and-hole system including a stationary or rotatable interface plate and at least one blade pitch lock assembly coupled to the interface plate, each lock assembly including a locking pin having a pin center axis parallel with a center axis of a locking hole to engage a respective one locking hole of the set of locking holes in a locked state, the wheel to the blade pitch angle. The method 906 may optionally comprise, at block 926, linking, by a linking arm 378, the interface plate and the pitch drive assembly together, wherein the linking arm follows the angular rotation of the pitch drive assembly. In some embodiments, the interface plate may be configured to rotate.

Computational Hardware Overview

FIG. 10 is a block diagram that illustrates a computer system 1000 upon which an embodiment of the invention may be implemented or employed for controlling the fluid-driven turbine 100. Thus, the computer system 1000 may be a turbine controller.

The terms "computing system" and "computer system" are used interchangeably herein. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more blocks of one or more methods described herein. Thus, the computer system is a special purpose computer system such as a turbine controller.

A sequence of binary digits constitutes digital data that is used to represent a number or code for a character. A bus 1010 includes many parallel conductors of information so that information is transferred quickly among devices coupled to the bus 1010. One or more processors 1003 for processing information are coupled with the bus 1010. A processor 1003 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1003 constitutes computer instructions.

Computer system 1000 also includes a memory 1004 coupled to bus 1010. The memory 1004, such as a random access memory (RAM) or other dynamic storage device, stores information including computer instructions. The memory 1004 may also include dynamic memory which allows information stored therein to be changed by the computer system 1000. RAM allows a unit of information stored at a location called a memory address to be stored and retrieved independently of information at neighboring addresses. The memory 1004 is also used by the processor 1003 to store temporary values during execution of computer instructions. The computer system 1000 also includes a read only memory (ROM) 1006, non-volatile persistent storage device or static storage device coupled to the bus 1010 for storing static information, including instructions, that is not changed by the computer system 1000. The ROM 1006 may be a secure byte-addressable memory (storage) device or a direct-access for files (DAX) memory device. The bus 1010 may also have coupled thereto other storage devices including a non-volatile (persistent) storage device, such as a magnetic disk or optical disk, for storing information, including instructions, that persists even when the computer system 1000 is turned off or otherwise loses power.

Information, including instructions, may be provided to the bus 1010 for use by the processor from an external input device 1013, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, may include a display device 1014, such as a cathode ray tube (CRT) or a liquid crystal display (LCD), light emitting diode (LED) displays, for presenting images, and a pointing device 1016, such as a mouse or a trackball or cursor direction keys, for controlling a position of a small cursor image presented on the display device 1014 (i.e., display device 150) and issuing commands associated with graphical elements presented on the display 1014.

In the illustrated embodiment, special purpose hardware, such as an application specific integrated circuit (IC) 1030, may be coupled to bus 1010. The special purpose hardware may be configured to perform operations not performed by processor 1003 quickly enough for special purposes.

Computer system 1000 also includes one or more instances of a communications interface 1070 coupled to bus 1010. Communication interface 1070 provides a two-way communication coupling to a variety of external devices that operate with their own processors, such as printers, scanners and external disks. The communication interface 1070 may communicate with the turbine 100 and/or the smart pitch system 360. Pointing device 1016, input device 1013 and display device 1014 may be associated with host computer 1082. For example, the host computer 1082 may be configured to receive updates to the tidal flow schedule which can then be used to update the fluid flow schedule 702. Alternately, the host computer 1082 and/or computing system 1000 may communicate with server 1093 to receive updated tidal flow data. The communication interface 1070 may communicate with hydraulic system(s) 199 or pneumatic systems.

In general, the computer system 1000 through the communication interface 1070 may be coupled with a network link 1078 that is connected to a local network 1080 to which a variety of external devices with their own processors are connected. In some embodiments, the local network 1080 may be a private network and may include wired and/or wireless communications. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 may be a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1070 sends and receives electrical, acoustic or electromagnetic signals, including infrared and optical signals, that carry information streams, such as digital data.

The term "computer-readable medium" is used herein to refer to any medium that participates in providing information to processor 1003, including instructions for execution. Such a medium may take many forms, including, but not limited to, non-volatile media, volatile media and transmission media. Non-volatile media include, for example, optical or magnetic disks, such as storage device. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. The term "computer-readable storage medium" is used herein to refer to any medium that participates in providing information to processor 1003, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term "non-transitory computer-readable storage medium" is used herein to refer to any medium that participates in providing information to processor 1003, except for carrier waves and other signals.

Logic encoded in one or more tangible media includes one or both of processor instructions on a computer-readable storage media and special purpose hardware, such as ASIC 1030.

Network link 1078 typically provides information communication through one or more networks to other devices that use or process the information. For example, network link 1078 may provide a connection through a private or local network 1080 to a host computer 1082, such as a secure host computer. For example, in some embodiments, the pilot may be located at the host computer 1082. Thus, the user interfaces referenced in FIG. 10, may be located with the host computer 1082.

In some embodiments, the computer system 1000 may connect to equipment 1084 operated by an Internet Service Provider (ISP) or Intranet Service Provider. ISP equipment 1084 in turn provides data communication services through the public, world-wide packet-switching communication network of networks now commonly referred to as the Internet 1090 or alternately over an Intranet. A computer called a server 1093 connected to the Internet or Intranet provides a service in response to information received over the Internet or Intranet.

The invention is related to the use of computer system 1000 for implementing the techniques described herein. According to one embodiment of the invention, those techniques are performed by computer system 1000 in response to processor 1003 executing one or more sequences of one or more instructions contained in memory 1004 to form a computer program product. Such instructions, also called software and program code, may be read into memory 1004 from another computer-readable medium such as storage device 1008. Execution of the sequences of instructions contained in memory 1004 causes processor 1003 to perform the method blocks described herein. In alternative embodiments, hardware, such as application specific integrated circuit 1030, may be used in place of or in combination with software to implement the invention. Thus, embodiments of the invention are not limited to any specific combination of hardware and software.

The memory 1004 and/or storage device 1008 may include smart pitch control instructions, hereinafter referred to as "applications 1020." The applications 1020 may include instructions for controlling the turbine 100 in turbine operational modes. The turbine operational modes may include non-power generating mode and power generating mode. In the non-power generating mode, the rotor shaft may be caused to stop so that the pitch angle of the blades may be changed. The applications 1020 may include instructions for a low blade loading condition determination unit 1024. The determination unit 1024 may include a sensor to confirm a low blade loading condition. In other embodiments, the determination unit 1024 may include instructions to determine when the low blade loading condition or commencement of the time of such condition. The applications 1020 may include instructions for the pitch angle adjustment sequence 1026, such as described in relation to FIG. 9B. The applications 1020 may include instructions for blade pitch angle determination 1028 for optimum turbine power generation between a pair of adjacent slack tide conditions. The optimum turbine power generation may be the maximum power generation within the turbine's power rating. The applications 1020 may include instructions for locking control 1050 to control the engagement and disengagement of the locking pins of the lock assembly.

Computer program code for carrying out operations described above may be written in a variety of programming languages, including but not limited to a high-level programming language, such as without limitation, C or C++, for development convenience. In addition, computer program code for carrying out operations of embodiments described herein may also be written in other programming languages, such as, but not limited to, interpreted languages. The program code may include hardware description language (HDL) or very high speed integrated circuit (VHSIC) hardware description language, such as for firmware programming. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a non-transitory, tangible computer-readable storage medium such as a magnetic tape, a flexible disc, a hard disc, a compact disc, a photo-magnetic disc, a digital versatile disc (DVD) or the like.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1003 as it is received or may be stored in storage device 1008 or other non-volatile storage for later execution, or both. In this manner, computer system 1000 may obtain application program code in the form of a signal on a carrier wave.

Various forms of computer readable media may be involved in carrying one or more sequence of instructions or data or both to processor 1003 for execution. For example, instructions and data may initially be carried on a magnetic disk of a remote computer such as host computer 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red a carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1003 retrieves and executes the instructions using some of the data sent with the instructions. The instructions and data received in memory 1004 may optionally be stored on storage device 1008, either before or after execution by the processor 1003.

The memory 1004 may have stored thereon applications implemented as software or computer instructions. The applications when executed by the processor 1003 may perform one or more functions and steps as described herein.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms "first," "second," etc., does not denote any order or importance, but rather the terms "first," "second," etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. A system comprising:
   a blade pitch system having a set of locking holes;
   a pitch drive assembly coupled to the blade pitch system and configured to rotate clockwise and, alternately, counterclockwise within a range of angular degrees to adjust a blade pitch angle;
   a pitch lock pin-and-hole system including an interface plate and at least one blade pitch lock assembly coupled to the interface plate, each blade pitch lock assembly including a locking pin having a pin center axis parallel with a center axis of a locking hole to engage a respective one locking hole of the set of locking holes in a locked state to lock the blade pitch angle;
   a rotor having a rotor housing and rotor drive assembly having a center rotor axis of rotation, the rotor drive assembly coupled to the pitch drive assembly; and
   a plurality of blades interfaced with the rotor housing in spaced relation to radiate from the rotor housing, wherein as the rotor housing rotates the plurality of blades rotate.

2. The system of claim 1, further comprising:
   at least one processor having program instructions stored therein which when executed causes the at least one processor to:
      determine a blade pitch angle for generation of power by a turbine based on fluid flow after a low blade loading condition;
      disengage said each blade pitch lock assembly at the low blade loading condition to initiate a pitch angle adjustment sequence while the turbine is in a non-power generation mode;
      during the non-power generation mode of the turbine, adjust the blade pitch angle of a blade to correspond to the determined blade pitch angle;
      reengage said each blade pitch lock assembly to lock the blade pitch angle; and
      activate the turbine to generate power in a power generation mode with the blade continuously locked to the determined blade pitch angle during the power generation mode.

3. The system of claim 2, wherein the low blade loading condition comprises a low blade loading period corresponding to one of slack tide and non-power generation mode of the turbine.

4. The system of claim 1, wherein the blade pitch system comprises a wheel including a circular shape with the set of locking holes arranged circumferentially around and in proximity to an outer edge of the wheel.

5. The system of claim 1, wherein said each blade pitch lock assembly further comprises:
   a housing mounted to the interface plate, the housing having a receptacle configured to receive the locking pin; and
   a locking pin articulation mechanism configured to, in response to a first control signal, disengage the blade pitch lock assembly by retracting the locking pin into the receptacle and, in response to a second control signal, engage the blade pitch lock assembly by ejecting the locking pin into an aligned locking hole in the blade pitch system.

6. The system of claim 1, further comprising a linking arm coupled to the interface plate and the pitch drive assembly, the linking arm follows the rotation of the pitch drive assembly.

7. The system of claim 1, wherein the blade pitch angle for generation of power by a turbine is based on fluid flow after a low blade loading condition wherein the low blade loading condition corresponds to slack tide.

8. A system comprising:
a turbine including an energy generator, a nacelle, a rotor coupled to the nacelle, and a plurality of blades; and
a plurality of smart pitch systems coupled to the plurality of blades, each smart pitch system comprising:
a blade pitch system having a set of locking holes;
a pitch drive assembly coupled to the blade pitch system and configured to rotate clockwise and, alternately, counterclockwise within a range of angular degrees to adjust a blade pitch angle of a respective one blade in a plane perpendicular to a rotor center axis of rotation; and
a pitch locking pin-and-hole system including an interface plate and at least one blade pitch lock assembly coupled to the interface plate, each blade pitch lock assembly including a locking pin having a pin center axis parallel with a center axis of a locking hole to engage a respective one locking hole of the set of locking holes in a locked state to lock the blade pitch angle,
wherein the blade pitch angle for generation of power by the turbine is based on fluid flow after a low blade loading condition.

9. The system of claim 8, further comprising:
at least one processor having program instructions stored therein which when executed causes the at least one processor to control each smart pitch system to:
determine the blade pitch angle for generation of the power by the turbine based on the fluid flow after the low blade loading condition;
disengage said each blade pitch lock assembly at the low blade loading condition to initiate a pitch angle adjustment sequence while the turbine is in a non-power generation mode;
during the non-power generation mode of the turbine, adjust the blade pitch angle of a blade to correspond to the determined blade pitch angle;
reengage said each blade pitch lock assembly to lock the blade pitch angle; and
activate the turbine to generate power in a power generation mode with the blade continuously locked to the determined blade pitch angle during the power generation mode.

10. The system of claim 9, wherein the low blade loading condition comprises a low blade loading period corresponding to one of slack tide and non-power generation mode of the turbine.

11. The system of claim 8, wherein the blade pitch system comprises a wheel including a circular shape with the set of locking holes arranged circumferentially around and in proximity to an outer edge of the wheel.

12. The system of claim 8, wherein said each blade pitch lock assembly further comprises:
a housing mounted to the interface plate, the housing having a receptacle configured to receive the locking pin; and
a locking pin articulation mechanism configured to, in response to a first control signal, disengage the blade pitch lock assembly by retracting the locking pin into the receptacle and, in response to a second control signal, engage the lock assembly by ejecting the locking pin into an aligned locking hole in the blade pitch system.

13. The system of claim 8, wherein:
the rotor comprises a rotor housing and rotor drive assembly having the center rotor axis of rotation, the rotor drive assembly coupled to the pitch drive assembly; and
the plurality of blades interfaced with the rotor housing in spaced relation to radiate from the rotor housing, wherein as the rotor housing rotates the plurality of blades rotate.

14. The system of claim 8, further comprising a linking arm coupled to the interface plate and the pitch drive assembly, the linking arm follows the rotation of the pitch drive assembly.

15. A method comprising:
driving a blade pitch system having a set of locking holes;
rotating, by a pitch drive assembly, the blade pitch system clockwise or counterclockwise within a range of angular degrees to adjust a blade pitch angle of a respective one blade in a plane perpendicular to a rotor center axis of rotation relative to a rotor housing;
locking, by a pitch locking pin-and-hole system including an interface plate and at least one blade pitch lock assembly coupled to the interface plate, each blade pitch lock assembly including a locking pin having a pin center axis parallel with a center axis of a locking hole to engage a respective one locking hole of the set of locking holes in a locked state;
operating a turbine in a non-power generating mode during the driving, rotating, and locking; and
operating the turbine in a power generating mode after the locked state.

16. The method of claim 15, wherein:
during operating of the turbine in the power generating mode, rotating a rotor of the turbine, the rotor comprising a rotor housing and rotor drive assembly having the center rotor axis of rotation, the rotor drive assembly coupled to the pitch drive assembly; and
rotating a plurality of blades interfaced with the rotor housing in spaced relation.

17. The method of claim 15, further comprising:
determining, by a processor, a blade pitch angle for generation of power by the turbine based on fluid flow after a low blade loading condition;
disengaging said each blade pitch lock assembly at the low blade loading condition to initiate a pitch angle adjustment sequence while the turbine is in a non-power generation mode, in response to a first control signal from the processor;
during the non-power generation mode of the turbine, adjusting the blade pitch angle of a blade to correspond to the determined blade pitch angle;
reengaging said each blade pitch lock assembly in response to a second control signal from the processor; and
activating the turbine to generate power in a power generation mode with the blades continuously locked to the determined blade pitch angle.

18. The method of claim 15, wherein a linking arm is coupled to the interface plate and the pitch drive assembly; and further comprising: following by the linking arm the rotation of the pitch drive assembly.

19. The method of claim 15, further comprising:
determining, by a processor, a blade pitch angle for generation of power by the turbine based on fluid flow after a low blade loading condition, wherein the low blade loading condition corresponds to slack tide.

\* \* \* \* \*